United States Patent
Leman et al.

(10) Patent No.: US 10,326,391 B2
(45) Date of Patent: Jun. 18, 2019

(54) MOTORDRIVER FOR PWM DRIVEN MOTORS

(71) Applicant: Melexis Bulgaria Ltd., Sofia (BG)

(72) Inventors: Dirk Leman, Lier (BE); Petko Nedelev, Sofia (BG)

(73) Assignee: MELEXIS BULGARIA LTD., Sofia (BG)

( * ) Notice: Subject to any disclaimer, the term of this patent is extended or adjusted under 35 U.S.C. 154(b) by 0 days.

(21) Appl. No.: 15/919,390

(22) Filed: Mar. 13, 2018

(65) Prior Publication Data

US 2018/0287523 A1 Oct. 4, 2018

(30) Foreign Application Priority Data

Mar. 30, 2017 (EP) .................................. 17164030

(51) Int. Cl.
| | | |
|---|---|---|
| *H02P 6/08* | (2016.01) | |
| *H02P 6/17* | (2016.01) | |
| *H02P 6/20* | (2016.01) | |
| *H02M 7/5387* | (2007.01) | |

(52) U.S. Cl.
CPC .................. *H02P 6/17* (2016.02); *H02P 6/08* (2013.01); *H02P 6/20* (2013.01); *H02M 7/53871* (2013.01)

(58) Field of Classification Search
CPC ...... H02P 1/00; H02P 1/24; H02P 1/46; H02P 3/18; H02P 3/00; H02P 6/00; H02P 6/14; H02P 27/04; H02P 27/06; G05B 11/28
USPC .... 318/400.01, 400.02, 400.14, 400.15, 700, 318/701, 599, 811; 361/23, 30
See application file for complete search history.

(56) References Cited

U.S. PATENT DOCUMENTS

| | | | |
|---|---|---|---|
| 5,744,921 A | 4/1998 | Makaran | |
| 5,929,576 A * | 7/1999 | Yasohara | H02H 7/0833 318/400.22 |
| 6,211,635 B1 * | 4/2001 | Kambe | H02P 6/085 318/400.09 |

(Continued)

FOREIGN PATENT DOCUMENTS

| | | |
|---|---|---|
| EP | 1171948 B1 | 7/2005 |
| EP | 1943723 B1 | 5/2014 |
| JP | 2010246173 A | 10/2010 |

OTHER PUBLICATIONS

European Search Report from EP Application No. EP 17 16 4030, dated Oct. 5, 2017.

*Primary Examiner* — Antony M Paul
(74) *Attorney, Agent, or Firm* — Workman Nydegger

(57) ABSTRACT

A motordriver for controlling a brushless DC motor, comprises: an output driver for controlling phase commutation of a power stage; the motordriver can be powered in a pulsed way having a PWM ON and OFF period; a position module for monitoring a position and/or speed of a rotor; at least a part of the position module remains active during the PWM OFF period; a power module configured for powering the active part during the PWM OFF period, comprising an energy storage medium and a blocking module configured such that during the PWM ON period the energy storage medium can be charged by the power supply, and such that the blocking module can block current flowing back to the power supply and block current flowing from the energy storage medium to the motor during the PWM OFF period.

13 Claims, 15 Drawing Sheets

(56) References Cited

U.S. PATENT DOCUMENTS

| | | | |
|---|---|---|---|
| 6,997,684 B2* | 2/2006 | Hahn | H02P 6/085 318/434 |
| 7,064,510 B2* | 6/2006 | Brannen | H02P 6/16 318/135 |
| 7,276,867 B2* | 10/2007 | Alberkrack | H02P 6/16 318/400.24 |
| 7,315,142 B2 | 1/2008 | Lindemann et al. | |
| 7,602,157 B2* | 10/2009 | Babcock | H02P 7/281 318/400.22 |
| 8,040,096 B2* | 10/2011 | Taniguchi | H02M 1/32 318/490 |
| 2008/0018274 A1 | 1/2008 | Mori et al. | |
| 2009/0256508 A1 | 10/2009 | Haas et al. | |
| 2012/0274247 A1* | 11/2012 | Zhao | H02P 6/20 318/400.01 |

* cited by examiner

MOTORDRIVER FOR PWM DRIVEN MOTORS

FIELD OF THE INVENTION

The invention relates to the field of BLDC motors. More specifically, it relates to a motordriver for a BLDC motor of which the speed is controlled by adjusting the supply of the motor.

BACKGROUND OF THE INVENTION

The speed of a motor (e.g. of a fan) may be controlled by linear regulation. Thereby the DC voltage across the motor is adjusted.

An alternative way to control the speed of a motor is by direct pulse width modulation. In that case the motor's power supply is modulated by a PWM waveform. Therefore a pass transistor may be positioned between the power supply and the VDD pin of the motor (the high side of the motor), or between the ground pin of the motor and the ground (the low side of the motor). By controlling the gate of this transistor the current path for the motor can be switched on or off. Thus, a PWM waveform can be applied.

Using a p-channel MOSFET (or a PNP) as pass device on the positive power supply wire of the motor requires a level shifter on the PWM signal to swing up to the motor voltage to drive the pass device. In that case, the tachometer or locked-rotor feedback unit on the motordriver can be pulled up to the supply of a remote controlling fan monitoring IC.

Alternatively an n-channel MOSFET (or an NPN) on the ground wire can be used instead. This allows the pass device to be driven by a 3.3V or 5V logic-level PWM signal, which is more easy to implement. However this implies that the ground of the feedback unit will be floating during the PWM OFF period, which complicates the feedback implementation.

There are existing different prior art PWM motor speed controllers that are compatible with either n-channel or p-channel motor drive.

An example of a prior art 4-wire motor solution is shown in FIG. 1. In this figure, a digital PWM signal is used to control the motordriver (e.g. fandriver). The motordriver provides speed information back via the FG (frequency generator or tachometer signal) feedback unit.

An example of a prior art 3-wire motor solution is shown in FIG. 2. In this example, the PWM signal of the fan monitor controls a high side switch in the supply line, and controls the motor speed by adjusting the duty cycle of the supply ON time. The FG feedback unit provides speed information to the remote fan monitoring IC.

An example of a prior art 2-wire solution is shown in FIG. 3. In this example, the fan monitor regulates the motor speed based on the sensed temperature of the object, which is being cooled by the motor. In this case, the fan monitor has no only indirect feedback of the motor speed. The fan monitor does not control the motor noise, and can only indirectly, through the temperature sensing guess if the motor is still working or not.

In the 2 and 3-wire solution, the motordriver will shut down during the PWM OFF period as soon as the VDD drops below the power down level of the motordriver. When the supply is switched on again, the motordriver will be initialized, and switch on the output driver according to the hall sensor information, with 100% duty cycle (ON/OFF control).

The initialization of the motordriver may take some time, during which the motordriver is not operating in a proper way. Also, no intelligent soft-switching algorithms can be applied which requires speed information. Finally, at low speeds the low BEMF will cause significant peak currents to flow, which lead to reduced lifetime and to audible noise.

By use of linear controlled switches the supply can be regulated in an analog way, avoiding the above disadvantages. However at cost of efficiency. Also, this method is limited in speed range. The range between the minimum speed and the maximum speed is limited by the minimum supply voltage. For instance, the minimum operating voltage for 12V motordrivers is as low as 2.5V. Even if at some extra motordriver cost the supply range could be reduced to 1.8V, still the ratio to the 12V supply voltage is more than 10%, which is the range which can be achieved with a 4-wire motor solution.

In summary, problems might occur when driving the motor at lower PWM frequencies (e.g. at frequencies below 30 Hz). As frequencies decrease, an audible change in the motor's speed during the on and off periods of the PWM waveform may be noticed. Moreover, the PWM ON period (the period during which the motor is powered) may become too short to allow the motor's internal electronics to turn on and begin driving the motor. Hence, motor reliability problems may occur when decreasing the PWM ON period.

In view of these problems, there is still room for improvement in motordrivers for PWM driven motors.

SUMMARY OF THE INVENTION

It is an object of embodiments of the present invention to provide a good motor driver for driving a motor by pulse width modulation of the supply.

The above objective is accomplished by a method and device according to the present invention.

In a first aspect, embodiments of the present invention relate to a motordriver for controlling a brushless DC motor having a stator with at least one winding, and a rotor with permanent magnets. The motordriver comprises an output driver electrically connected to a power stage, which is configured to be electrically connected to the motor, wherein the output driver is adapted for controlling phase commutation of the power stage. The motordriver comprises a VDD pin for connecting a power supply and a ground pin for connecting a ground wherein a PWM pin is either the VDD pin or the ground pin and wherein the PWM pin can be used for connecting a pulse width modulation module such that the motordriver can be powered in a pulsed way by modulating the power from the power supply such that during a PWM ON period the motordriver and the motor are powered by the power supply and such that during a PWM OFF period the motordriver and the motor are not powered by the power supply. The motordriver comprises a position module configured for monitoring a position of a rotor in the motor and/or for monitoring a speed of the rotor. The motordriver is configured such that at least a part of it remains active during the PWM OFF period, wherein this active part comprises at least part of the position module. The motordriver moreover comprises a power module configured for powering the active part of the motordriver during the PWM OFF period. The power module comprises an energy storage medium and a blocking module which are configured such that during the PWM ON period the energy storage medium can be charged by the power supply, and such that the blocking module can block current flowing from the energy storage medium back to the power supply, and block current flowing from the energy storage medium to the motor during the PWM OFF period.

It is an advantage of embodiments of the present invention that it allows to control a brushless DC motor (e.g. configured to propel an air-moving fan or a liquid-moving pump) in speed by adjusting the supply of the motor. It is an advantage of embodiments of the present invention that this can be done by PWM of the power supply of which the duty cycle also is referred to as the supply PWM duty cycle. It is an advantage of embodiments of the present invention that also during the PWM OFF period the active part of the motordriver is powered.

This active part comprises at least part of the position module, which is configured for monitoring a position of a rotor in the motor and/or for monitoring a speed of the rotor. Since the active part is powered during the PWM off period the position of the rotor and/or the speed of the rotor is known during and also directly after the PWM off period. This allows a smooth operation of the output driver which is controlling the phase commutation of the power stage in function of the position of the rotor.

In embodiments of the present invention, the motor driver applies no commutation, or at least a different commutation scheme during the PWM OFF period, compared to the driving commutation scheme which is applied during the PWM ON period.

It is an advantage of embodiments of the present invention that the motordriver can monitor the rotor position during the PWM OFF period. Using this rotor position information the motordriver can instantly restart applying its driving commutation scheme, to the motor during the PWM ON period.

It is an advantage of embodiments of the present invention that the motordriver does not need to go through a power on sequence, each time after a PWM OFF period, initializing its digital and analog circuits. It is an advantage that the output driver is informed that the fan is already spinning, and thus that it should not go through a startup commutation scheme optimized to start the motor from stand still. It is an advantage that based on the uninterrupted rotor position information, a speed signal can be derived. Such speed signal can be used to optimize the commutation control as a function of the speed, such as applying soft switching methods, e.g. applying a Flat period and/or a rising slope and/or falling slope, which are a portion, e.g. 1/16) of the electrical half period (EHP).

In embodiments of the present invention the motordriver comprises a plurality of components and a control module configured for activating and/or deactivating at least some of the components, and/or changing the functionality of at least some of the components when the powering of the motor changes between the PWM ON period and the PWM OFF period.

A component of the motordriver may implement a specific functionality of the motordriver, it may comprise hardware (e.g. part of a circuit, a completer circuit, a memory module, an FPGA module) and/or software running on this hardware, and/or firmware (e.g. on an FPGA module). By activating and/or deactivating at least some of the components the control module may for example change the operation of a circuit, may switch between circuits, adapt the sensing resolution and/or accuracy, may enable or disable a complete circuit. It may for example switch the power stage to Z, i.e switching all driving transistors OFF, or, for 1coil or 3phase motors, switch the power stage to freewheeling, i.e. switch on at least two low side transistors or at least 2 high side transistors, or switching between Z and freewheeling, etc.

By activating and/or deactivating at least some of the components of the motordriver the control module may for example reduce the power consumption of the motordriver during the PWM off period and therefore allow to use a power module which can generates less power during the PWM OFF period (than in the case no control module would be present). In case the power module for example comprises a buffer capacitor it is possible to limit the size of the buffer capacitor.

The control module may for example be configured for disabling the power stage during the PWM off period.

In embodiments of the present invention motordriver comprises a power adjusting module configured for obtaining a back EMF indicative signal of the motor and the output driver is adapted for reducing the amount of the pulsed power that is driving the motor and/or for reducing peak currents in the motor, based on the back EMF indicative signal.

It is an advantage of embodiments of the present invention that the amount of the pulsed power that is driving the motor can be reduced based on an indication of the maximum BEMF voltage amplitude, referred to as a BEMF indicative signal. This is a second way to reduce the pulsed power, next to the reduction of the supply PWM DC.

In embodiments of the present invention, the output driver is adapted for applying soft switching based on the rotor position and/or speed monitored by the position module.

It is an advantage of embodiments of the present invention that the acoustic noise is reduced by an output driver, which is adapted for applying soft switching. It is an advantage of embodiments of the present invention that the soft switching method may be adapted as a function of the BEMF indicative signal, as a third means to adjust the power applied on the motor.

In embodiments of the present invention, the energy storage medium is a buffer capacitor.

In embodiments of the present invention, the control module comprises a detection circuit configured for detecting the PWM OFF period by comparing a signal on the PWM pin with a threshold level.

It is an advantage of embodiments of the present invention that the control module is adapted for detecting the PWM off period. This permits the control module to control the output driver such that the motor does not consume power from the power module during the PWM OFF period. The power of the power module may for example be stored on a buffer capacitor and its energy should be preserved for the IC operation. For this, the detection circuit should be able to react as fast as possible on the PWM OFF. For example, this may be done by using a comparator on the PWM pin.

In embodiments of the present invention, the motordriver comprises a feedback unit. The feedback unit comprises an input and an output. The feedback unit and the position module are configured such that when the input of the feedback unit is controlled by the position module the output is indicative for the status of the motor.

It is an advantage of embodiments of the present invention that the input of the feedback unit is controlled by the position module. As this position module is also powered during the PWM OFF period, the feedback unit will also be controlled during the PWM OFF period.

In embodiments of the present invention, the output of the feedback unit is connected with a feedback pin.

In embodiments of the present invention, the feedback unit comprises an open drain transistor wherein the position module is configured to control the gate of the open drain transistor to generate an output which is indicative for the status of the motor.

It is an advantage of embodiments of the present invention that the gate of the open drain transistor is controlled by the position module. As at least part of the position module is also operational during the PWM OFF period, this implies that this gate is also controlled during the PWM OFF period.

It is an advantage of embodiments of the present invention that the output of the feedback unit is indicative for the status of the motor, and this also during the PWM OFF period even when the motordriver is connected in a high side PWM configuration.

In embodiments of the present invention the feedback unit comprises a current source and a pull down resistor which is connected to the ground pin of a remote controller. The current source is connected between the pull down resistor and the power module, or a dedicated supply that takes its energy from the power module, and wherein the output is the interconnection between the current source and the pull down resistor and wherein the current source is controlled by the position module such that in operation the output is indicative for the status of the motor.

It is an advantage of embodiments of the present invention that a voltage signal can be realized on the feedback pin which is not influenced by the switching ON and OFF of the low side supply switch. It is an advantage of embodiments of the present invention that it is not required to increase the PWM ON period in order to obtain a signal, which is indicative for the frequency of the motor.

It is an advantage of embodiments of the present invention that the current source allows to ensure a controlled amount of current is drawn (such that the output is indicative for the status of the motor), independent of the external pull down, the supply voltage, the temperature, or even in case of a short. This is particularly advantageous if the power is drawn from a buffer capacitor.

In a second aspect, embodiments of the present invention relate to a method for driving a brushless DC motor which is powered with a pulse width modulated (PWM) power supply and controlled by a motordriver. The method comprises the following steps:
charging an energy storage medium of a power module during a PWM ON period,
powering at least part of the motordriver using the energy storage medium during a PWM OFF period such that a position of a rotor in the motor is monitored during the PWM ON period and during the PWM OFF period.

In embodiments of the present invention the method moreover comprises a step for activating and/or deactivating of components of the motordriver, and/or for changing the functionality of components of the motordriver when the powering of the motor changes between the PWM ON period and the PWM OFF period.

In embodiments of the present invention, the method comprises moreover the steps of:
obtaining a BEMF indicative signal of the motor,
controlling how much of the power from the power supply is driving the motor based on the BEMF indicative signal.

In embodiments of the present invention, the method moreover comprises the following steps:
generating an output signal which is indicative for the status of the motor using a feedback unit,
powering the feedback unit during the PWM OFF period.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
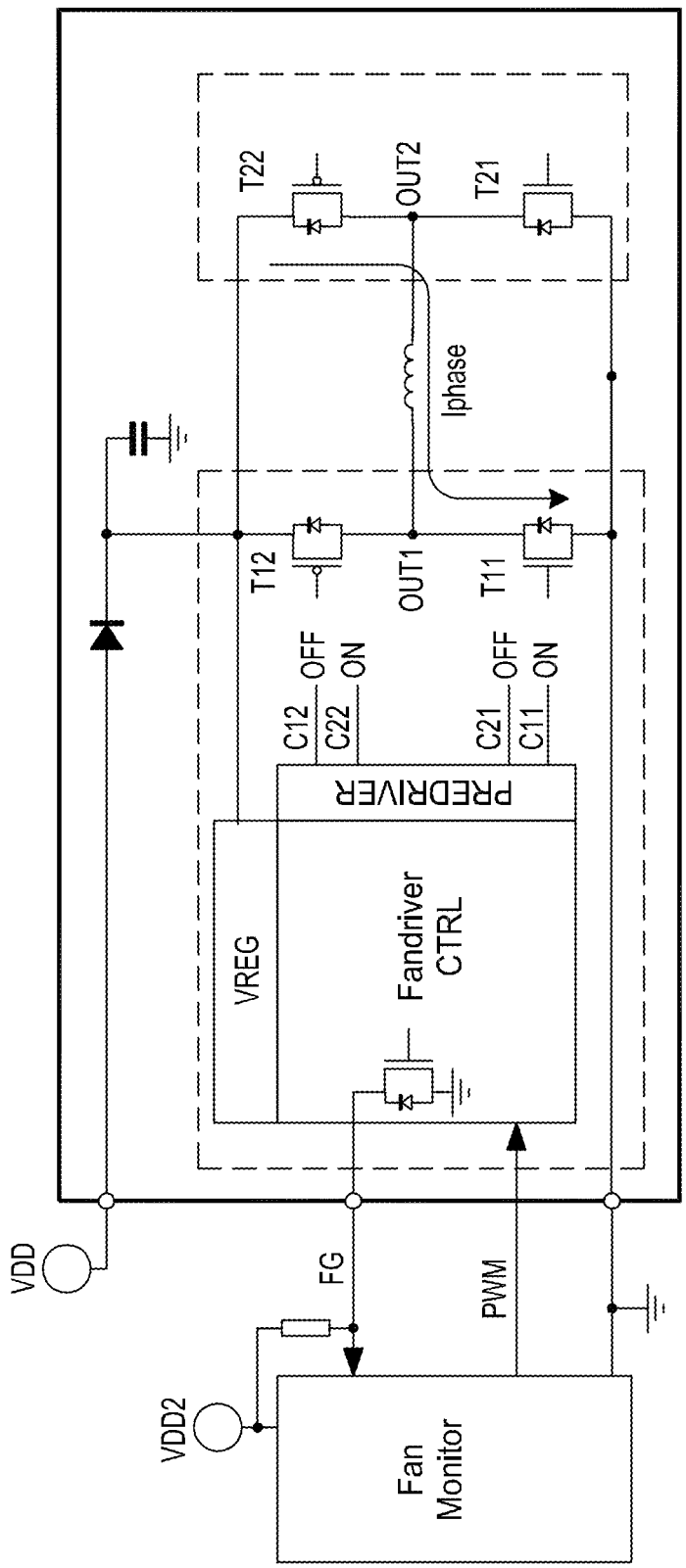
FIG. 1 shows a prior art 4-wire configuration for a PWM motor speed controller.
Figure 2:
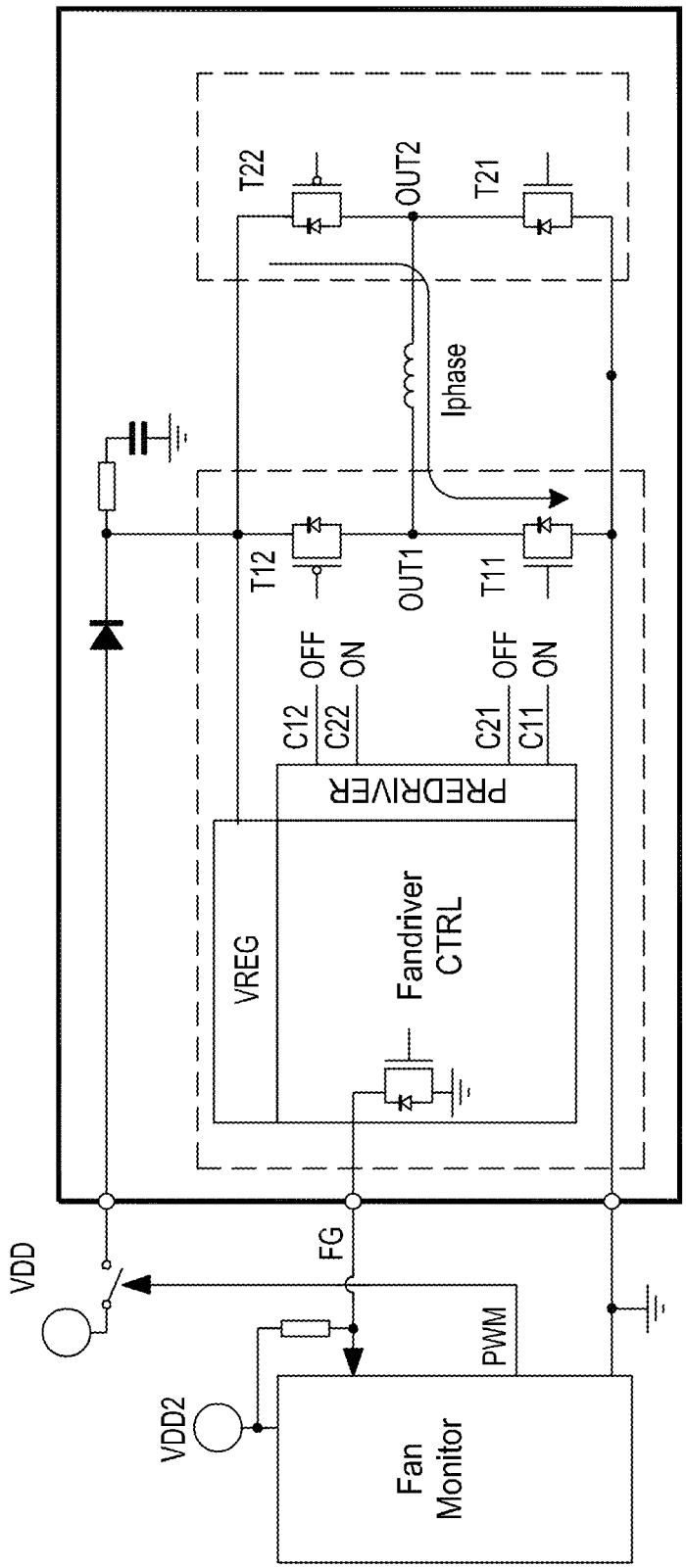
FIG. 2 shows a prior art 3-wire configuration for a PWM motor speed controller.
Figure 3:
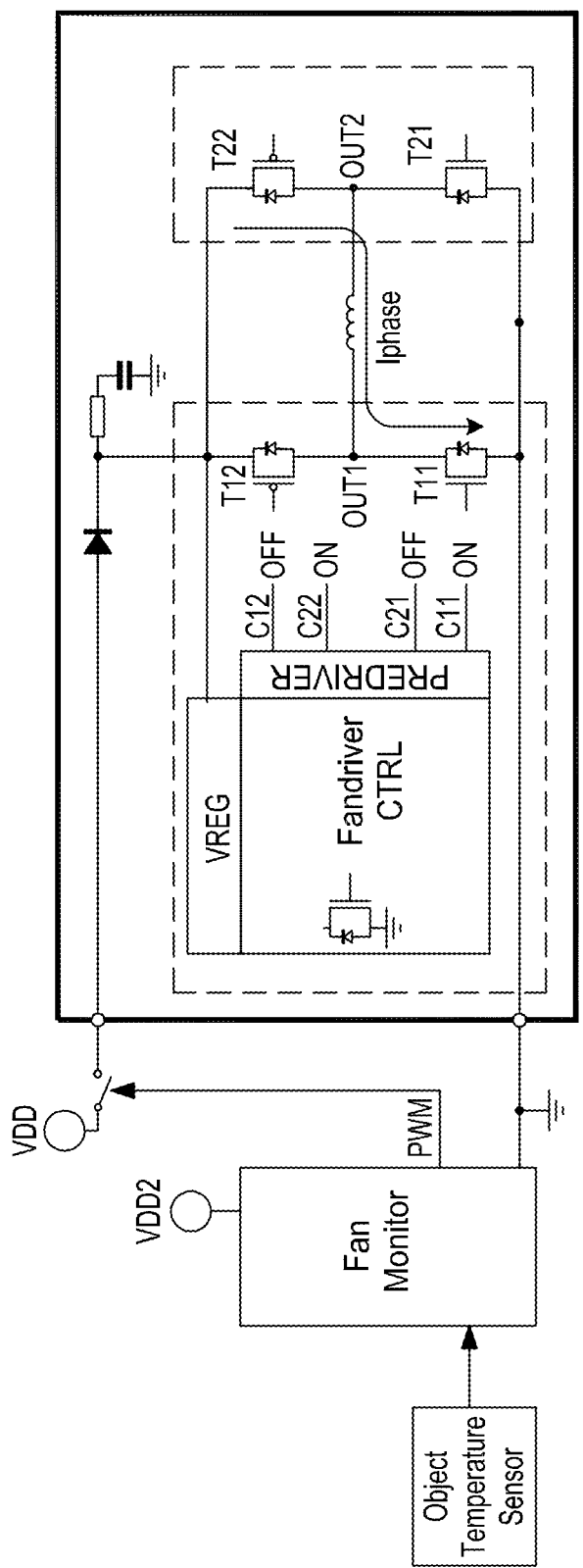
FIG. 3 shows a prior art 2-wire configuration for a PWM motor speed controller.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a motordriver 100 for controlling a brushless DC motor. The motor may for example be a BLDC motor and it may for example be used to drive a fan. The motor may be a single coil BLDC motor.

The motordriver may comprise a power stage 160, which is adapted to be electrically connected to the motor and the motordriver 100 comprises an output driver 150 electrically connected to the power stage 160. The output driver 150 is adapted for controlling phase commutation of the power stage 160.

Figure 13:
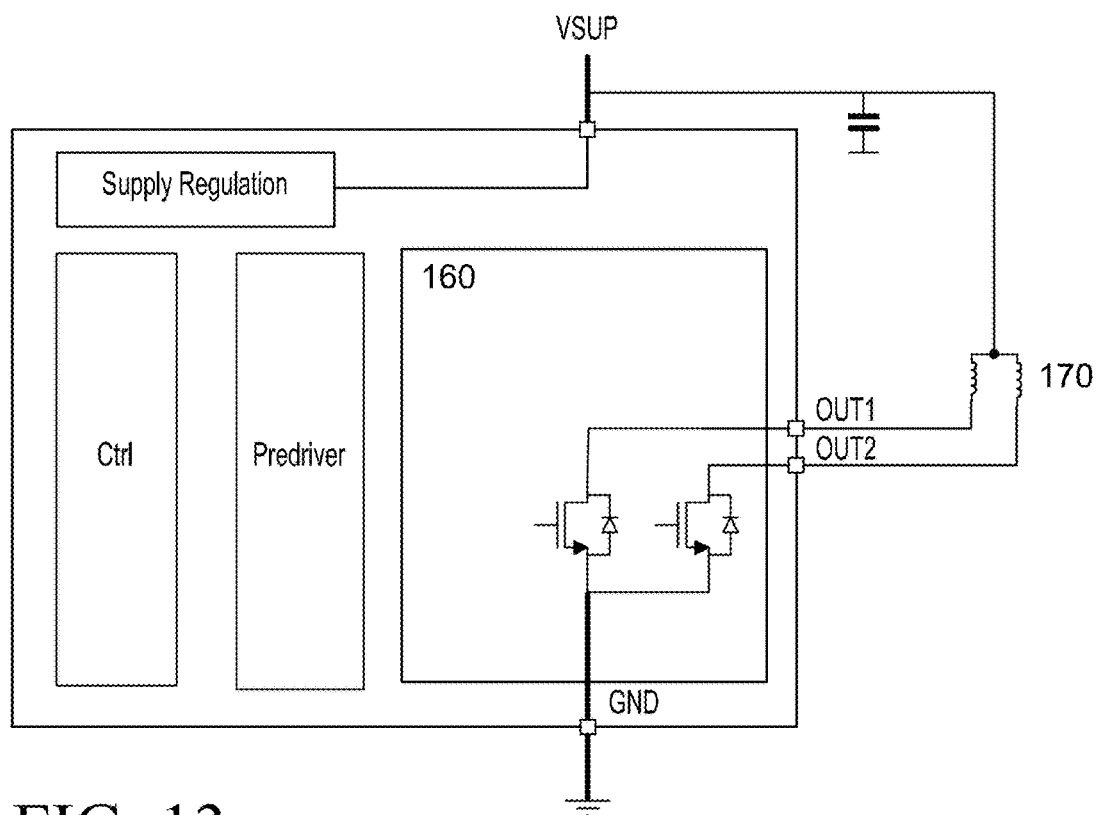
FIG. 13 shows a schematic drawing of a 2-coil type motor operated using a powerstage comprising 2 transistors.
Figure 14:
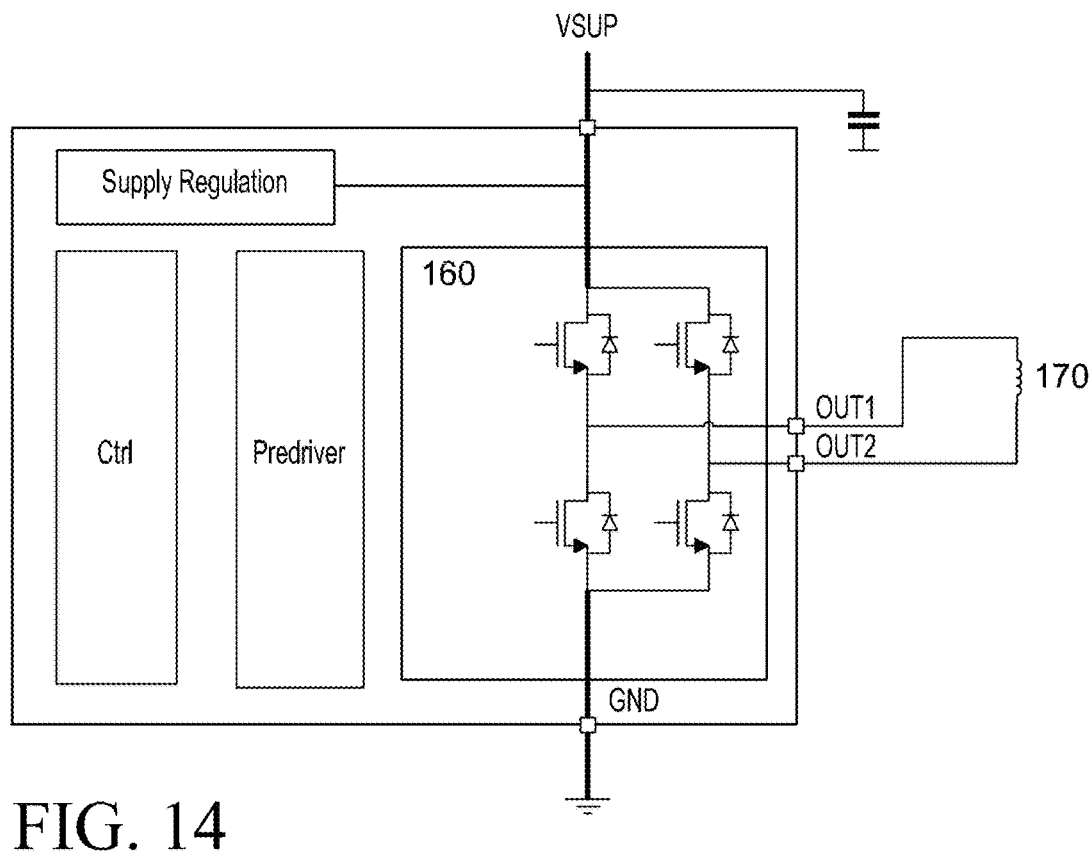
FIG. 14 shows a schematic drawing of a 1-coil type motor operated using a full bridge.
Figure 15:
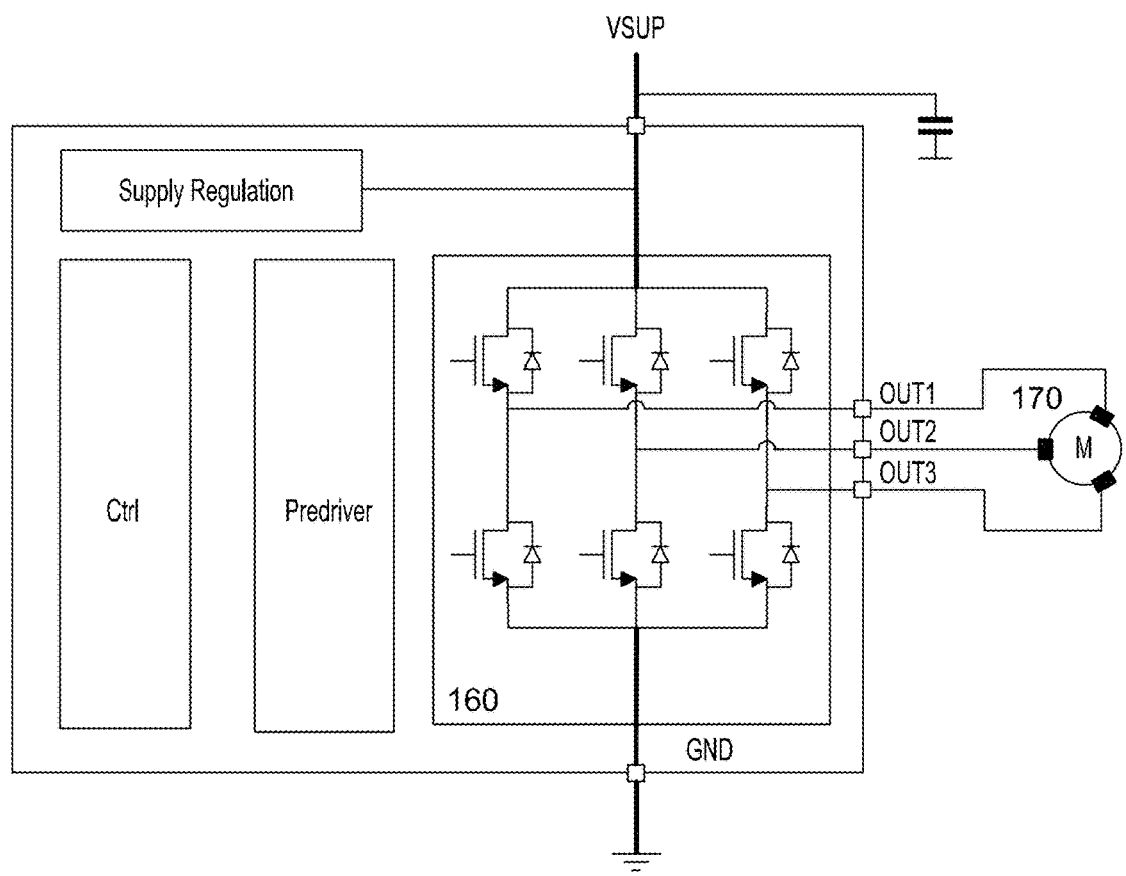
FIG. 15 shows a schematic drawing of a 3-phase type motor operated using a powerstage comprising 3 half-bridges.

The brushless DC motor can be of:
a 2-coil type, which is operated using a powerstage comprising 2 transistors (see e.g. FIG. 13),
a 1-coil type, which is operated using a full bridge (see e.g. FIG. 14 which illustrates a full bridge power stage 160 for driving one coil 170),
a 3-phase type, which is operated using three half bridges (see e.g. FIG. 15 which illustrates a 3-phase motor 170 driven using three half bridges 160).

The motordriver 100 comprises a VDD pin 101 for connecting a power supply 199 and a ground pin 102 for connecting a ground. By applying a voltage over these pins, using the power supply, the motordriver can be powered. In embodiments of the present invention a pulse width modulation module 110 (PWM module) can be connected to one of these pins such that the motordriver can be powered in a pulsed way by modulating the power from the power supply. The pin to which the PWM module is connected is also referred to as the PWM pin. The PWM module allows to switch between a PWM ON period and a PWM OFF period. During the PWM ON period the motordriver and the motor are powered by the power supply and during the PWM OFF period the motordriver and the motor are not powered by the power supply.

The motordriver comprises a position module 140 configured for monitoring a position of a rotor in the motor and/or for monitoring a speed of the rotor.

The motordriver is configured such that at least a part of it remains active during the PWM OFF period, wherein this active part comprises at least a part of the position module.

The motordriver 100, moreover, comprises a power module 130 configured for powering the active part of the motordriver during the PWM OFF period. It is thereby advantageous that at least part of the motordriver remains active during the PWM OFF period.

The power module 130 comprising an energy storage medium 132 and a blocking module 134 which are configured such that during the PWM ON period the energy storage medium 132 can be charged by the power supply, and such that the blocking module 134 can block current flowing from the energy storage medium 132 back to the power supply 199, and block current flowing from the energy storage medium to the motor 170 during the PWM OFF period. In embodiments of the present invention, such as for instance shown in FIG. 4, the blocking module 134 may be distributed over multiple components (each implementing part of the functionality of the blocking module). In the embodiment represented in FIG. 4 the functionality of the blocking module 134 is for example distributed over a reverse polarity diode and part of the output driver. The reverse polarity diode 136 can be used to block the current from flowing from the storage medium 132 back to the supply 199. During the PWM OFF period the output driver may be configured to keep the high side FETs 161, 162 in the OFF state to avoid current from the storage medium 132 to flow to the motor 170. Possibly flyback energy from the motor may flow via the body diodes of the high side FET and charge the storage medium. Optional clamping protection structures may have to be added to prevent excessive voltages for such flyback events.

In embodiments of the present invention the motordriver 100 may comprise a control module 120 configured for disabling at least part of the functionality of the motordriver 100 during at least part of the PWM OFF period thereby leaving only part of the motordriver active and/or reducing the power consumption of the motordriver and/or select between alternative circuits (e.g. different comparator, ADCs with different sampling rate, comparator instead of ADC adapted for operation during the PWM OFF period. It is an advantage of embodiments of the present invention that by modifying the operation of the motordriver during the PWM OFF period the power consumption can be reduced.

As described below the position module may for example also comprise different modules. Depending on the PWM period a different module may be powered. The control module may provide input on the state of the PWM supply, to the output driver which is configured to switch off building blocks of the motordriver and/or possibly also switch on, or modify the operation of building blocks of the motordriver, such that the operation is more adapted to the operation during the OFF period of the supply PWM, for instance such that the overall current consumption is reduced.

In embodiments of the present invention, the motordriver comprises an output driver for driving the FETs 161, 162, 163, 164 of the power stage 160, and the control module 120 is adapted for triggering the output driver 150 to switch off the power stage 160 during at least part of the PWM OFF period. The control module may be a circuit.

In embodiments of the present invention, the control module comprises a detection circuit for detecting the PWM OFF period. This may be done by comparing a signal on the PWM pin with a threshold level. In embodiments of the present invention, the detection circuit comprises a comparator for this comparison. Alternatively, the detection circuit may comprise an ADC for the comparison. The threshold level may be a programmable threshold level, or it may be a fixed threshold level. The signal may be a differential signal. As soon as the signal (e.g. the voltage) on the PWM pin is below the threshold level it is detected that the pulse width modulation module is in the PWM OFF period.

In embodiments of the present invention, all or part of the components may be integrated in an IC (also referred to as the motordriver IC. These components may for example be the power stage, the position module, the power module (or part thereof, for example part of the blocking module may be internal another part may be external), the output driver, a power adjusting module. The invention is not limited thereto and not necessarily all of them are integrated in the IC.

Figure 4:
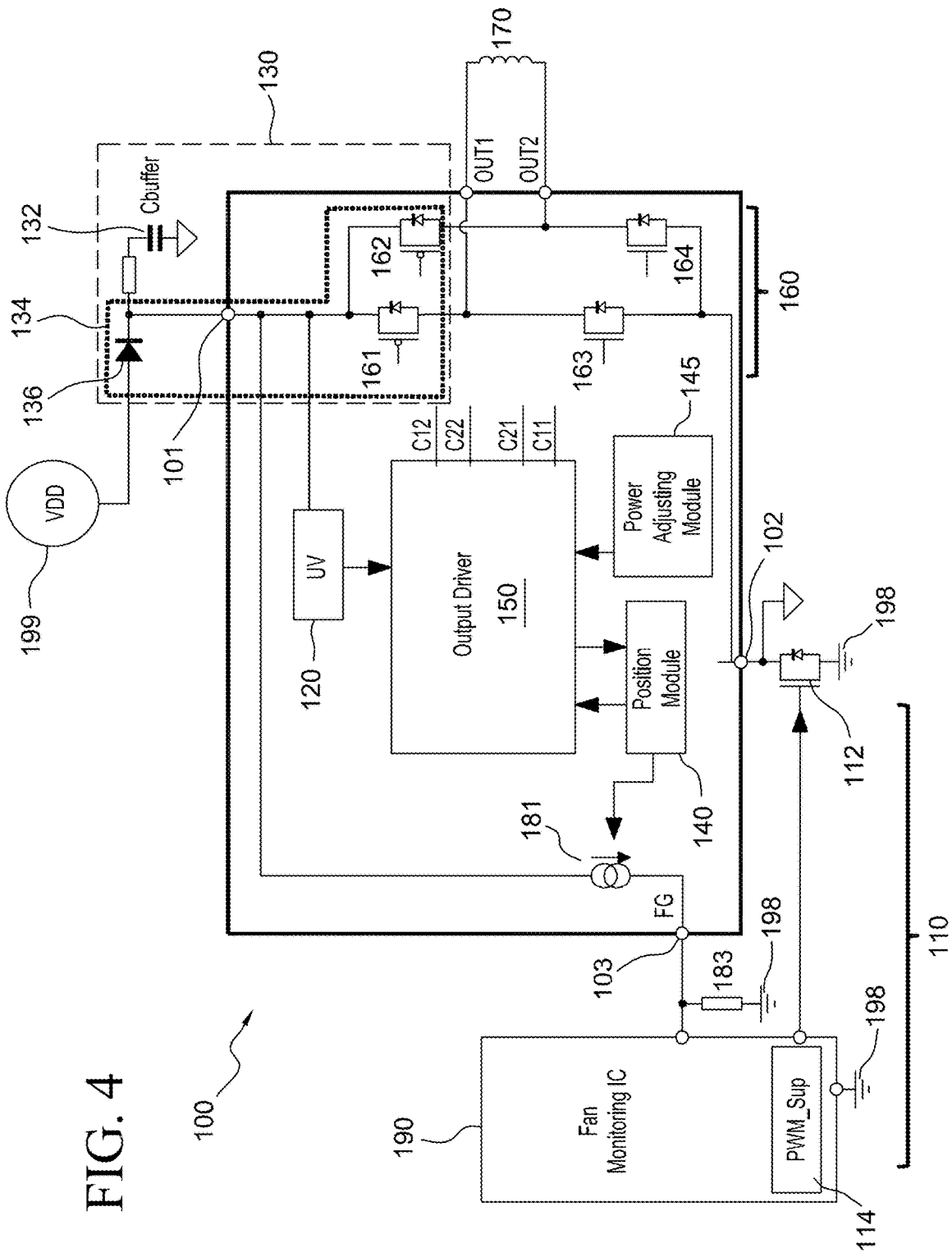
FIG. 4 shows a schematic drawing of a motordriver, driven using low side PWM, comprising a blocking module distributed over different components, in accordance with embodiments of the present invention.

FIG. 4 schematically shows an exemplary embodiment of a motordriver in accordance with embodiments of the present invention. This example shows a 2-wire motor driven using a low side PWM. The motor comprises a power stage 160 for driving a phase current through a coil of the motor 170. The power stage comprises FETs 161, 162, 163, 164. The motordriver 100 comprises an output driver 150 which is adapted for controlling phase commutation of the power stage 160.

FIG. 4 also shows a PWM module 110 which comprises a pass transistor 112 (in FIG. 4. represented as an NFET) and a PWM supply driver 114. The pass transistor 112 is connected between the ground pin 102 of the motordriver 100 and a ground pin 198 of a remote controller (the fan monitoring IC 190). It is therefore referred to as a low side transistor (in comparison with a high side transistor which would be connected between the VDD pin 101 of the motordriver 100) and the supply 199. During operation of the PWM module the PWM supply module 114 applies a digital signal to the pass transistor. Having the PWM module at the low side is advantageous in the sense that a pass transistor of the N-type is the cheaper solution compared to a high side pass transistor of the P type. Also since no dissipation will be needed for linear regulation, the FET costs are minimized.

FIG. 4 also shows a control module 120 which is configured for disabling at least part of the functionality of the motordriver. In this exemplary embodiment of the present invention the control module comprises an UV (Under Voltage) detection circuit which can inform the output driver to shut down or modify the control method of at least part of the power stage 160 as soon as the low side FET 112 is switched OFF (i.e. in the PWM OFF period) with the signal from the PWM supply module 114. For instancing by disabling the high side transistors 161, 162, it is avoided that current from the buffer capacitor will flow the motor. By disabling the low side transistors, the braking effect on the motor during the PWM OFF period can be minimized. Optionally the disabling of the low side transistor may coincide with the disabling of the high side transistors, or the timing may be delayed, for instance to allow a gradual reduction of the motor current in the motor to avoid the flyback pulse which is the consequence of sudden interruption of current flowing through an inductance. Alternatively, any flyback pulse current due to the disabling of the low side transistors can also be buffered or clamped onto the buffer capacitor through the body diode of the high side transistors.

In embodiments of the present invention the motordriver comprises a position module 140 adapted for monitoring a position of a rotor in the motor and/or for monitoring a speed of the rotor. Using this information the motordriver can restart the motor during the PWM ON period.

Figure 5:
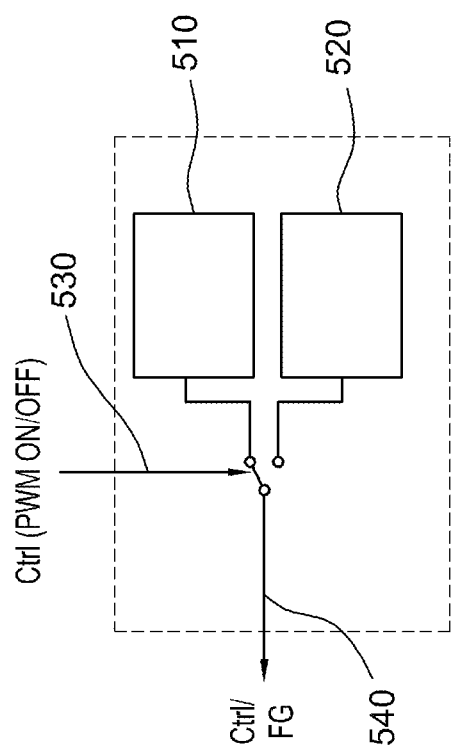
FIG. 5 shows a schematic drawing of a position module comprising two different components in accordance with embodiments of the present invention.

As illustrated in FIG. 5, the position module may comprise at least two different modules. A first module 510 which is operated in the PWM ON period and which may consume more power than the second module 520 which is operated in the PWM OFF period. The first module 510 may for example have a higher accuracy than the second module 520 and the second module may for example have a reduced power consumption.

The first module 510 may for example comprise a Hall sensor whereas the second module may not require a Hall sensor, but for instance just a comparator that detects the BEMF zero crossings. In embodiments of the present invention, it may be that during the PWM off period no current is controlled. In these embodiments, the current may not alternate from one direction to the other. In embodiments of the present invention, the second positioning module may only serve to maintain the control of a timer module in the output driver during the PWM OFF period, when the first module 510 is disabled or reduced in functionality. The advantage of such a second module can be that it consumes less power. Alternative implementations for the first and second module may for example be based on voltages and currents in the motordriver. A typical Hall sensor implementation is disclosed in EP1171948B1. BEMF zero crossing detection is described in EP1943723B1. It discloses driving waveforms which enable detection of the BEMF zero crossings by monitoring the BEMF. From this the position of the rotor can be determined. U.S. Pat. No. 7,315,142B2 discloses a position module which uses an ADC or comparator for supplying the rotor position information. Switching between both modules may be done by the control module which therefore uses a control input 530. The control module may be configured for switching the position module such that it uses the first module 510 during the PWM ON period and such that it uses the second module 520 during the PWM OFF period.

The position module may have an output signal 540 which is indicative for the rotor position and/or speed.

As mentioned before the first module may be based on a Hall sensor. In that case the Hall sensor may generate a real analogue voltage. This one swings like a sine wave. This sine wave can be sampled with an ADC and an output signal may be generated which indicates the rotor position. In other embodiments the hall sensors are a type of latches which are on at a given magnetic strength which switch off at a given magnetic strength.

In embodiments of the present invention the control module is configured for detecting (e.g. using an under voltage detection circuit) whether the motordriver is powered in the PWM ON period or in the PWM OFF period. In embodiments of the present invention the control module 120 will trigger the output driver 150 to start the motor as soon as the PWM ON period is detected.

As the position module 140 keeps track of the rotor position and/or speed during the PWM off phase, and because the position module and the output driver are adapted to pass this information from the position module to the output driver, the output driver can control the phase commutation in accordance with the rotor position as soon as the PWM on period is started. It is thereby an advantage that the influence of the PWM on the speed of the rotor and on the acoustic noise of the motor can be reduced.

This as opposed to prior art PWM solutions wherein, at PWM on, the output driver is powered on, and has no information about the speed of the motor. It can only detect the actual rotor pole that is facing the coil, and ensure the coil current Iphase flows in the correct direction. In embodiments of the present invention, the output driver may be adapted for applying soft switching. This control is based on the position of the rotor and/or speed of the rotor. It may for example be based on the time of the electrical half period (EHP). The output driver may for example reduce the applied motor PWM before the optimal commutation point. This may for example be done around $\frac{1}{16}$ of the EHP, before the optimal commutation point. It is thereby advantageous that a soft transition (without discrete steps) in the current direction is realized.

However, since in prior art motordrivers a commutation may have happened during the PWM OFF period, the latest commutation point may have fallen during the PWM OFF period, so when the position module was not active. In these prior art motordrivers, the motordriver cannot predict when the optimal commutation point is expected, and therefore cannot initiate the softswitching $\frac{1}{16}$ before this point.

It is therefore an advantage of embodiments of the present invention that the motordriver comprises a position module for monitoring a position or speed of the rotor which remains active, and keeps track of the rotor position also during the PWM OFF period.

Figure 16A:
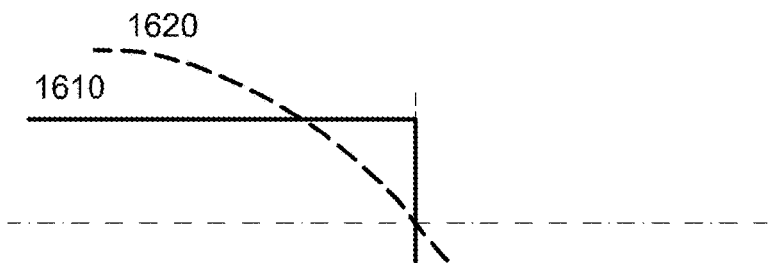
FIGS. 16A to 16E show examples of driving signals for soft switching.

FIGS. 16A to 16E show examples of driving signals for soft switching. In its simplest form the output bridge driver can commute the driving signal 1610 (e.g. voltage wave) form exactly on the back-EMF voltage 1620 zero crossing, this is referred to as hard commutation and is shown in FIG. 16A. In that case, the falling edge of a driving signal in one commutation cycle starts at the same moment as the rising edge of the driving signal in the following commutation cycle.

However, due to delay in response of the current in the coil, and because the BEMF voltage is also not changing its polarity instantaneously, such simple commutation leads to reduced efficiency, reverse current and increased noise. In practice a minimum time window is applied between the start of the falling edge in one commutation cycle, and the start of the rising edge of the driving signal 1610 (e.g. voltage wave) in the next commutation cycle.

Figure 16B:
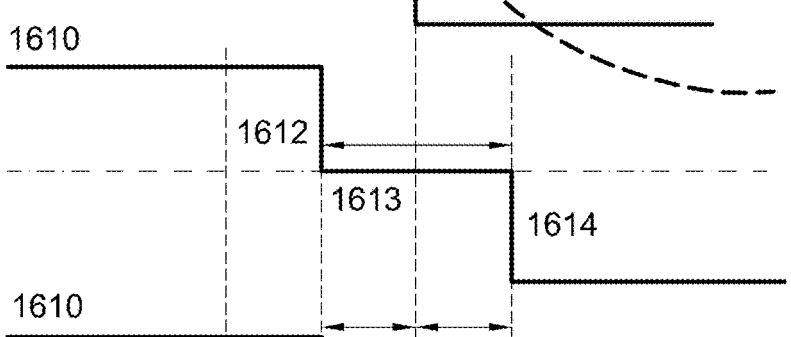

In embodiments of the present invention, the falling edge and the rising edge may have different shapes. The falling edge 1612, and the following rising edge 1614 of the driving signal can be realized as instantaneous, abrupt changes of the output duty cycle from DCout (the resulting applied voltage is DCout×VDD wherein VDD is the voltage from a power supply) to 0%, and from 0% to DCout respectively, with a so called flat period 1613 in between where DCout=0%. An example thereof is illustrated in FIG. 16B.

Figure 16C:
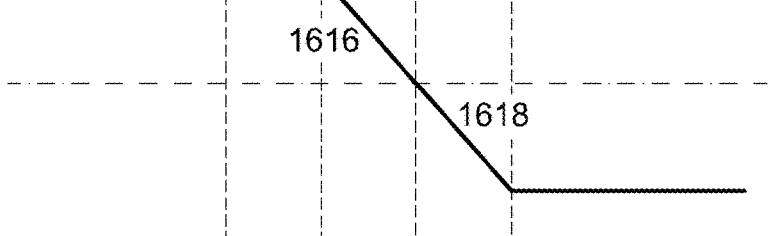

In embodiments of the present invention, the shape of the falling edge or rising edge may be a sloped shape, possibly combined with a flat period. By realizing the transitions of the driving signal in a more gradual way the acoustic noise can be further improved. FIG. 16C shows a so called Slope-Slope switching which uses 2 equal slope shapes 116, 118 for rising and falling slope of subsequent driving signals. Such slopes may be regulated to be $\frac{1}{16}$ of an electrical half period (EHP).

Figure 16D:
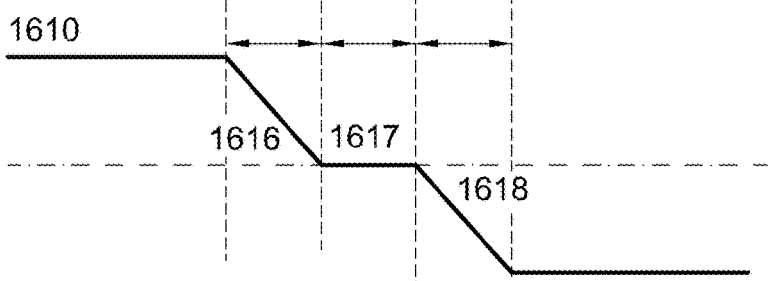

For higher current levels, and higher motor speeds, the shape of the falling edge and /or rising edge may comprise an additional flat portion 1617 which further allows the coil current the time to decay, as shown in FIG. 16D, realizing a Slope-Flat-Slope (1616-1617-1618) switching.

Figure 16E:
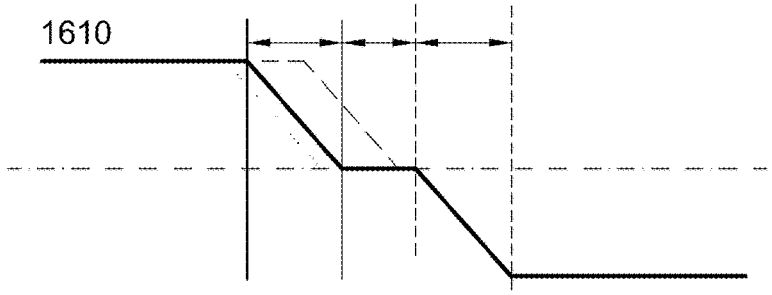

Such additional flat may, however, cause additional noise at lower speeds and/or lower current levels. Therefore the slopes may be adaptively controlled to reduce the flat period, as shown in FIG. 16E.

In embodiments of the present invention, the power module 130 comprises a storage medium 132 and a blocking module 134, 634, 834. In embodiments of the present invention the blocking module may comprise an external diode 136 and/or it may comprise a diode 634 integrated together with other modules of the motordriver in an IC, and/or it can be realized as an external transistor and/or it may comprise a transistor 834 integrated with other modules of the motordriver in an IC, and/or it may use transistors 161, 162, 163 and/or 164 from the powerstage for the purpose of blocking or limiting current from flowing from the storage medium to the motor, or from the motor to the power supply. Also the buffer capacitor can be realized as a capacitor internal, and/or external to the IC.

In embodiments of the present invention the buffer capacitor 132 and a blocking diode 634 are connected such that during the PWM ON period the buffer capacitor 132 is charged from the power supply, and such that the blocking diode 634 blocks current flowing back to the power supply during the PWM OFF period. An example thereof is illustrated in FIG. 4 which shows a diode 136 connected with its anode to the power supply (VDD) and with its cathode to the buffer capacitor 132 (with possibly in between both a protecting resistor which is advantageous for limiting excessive inrush currents) which is connected with its other side to the IC ground 102. The cathode of the diode 136 is also connected with the rest of the motor driver such that the motor driver 100 can be powered by the power supply (VDD) via the cathode of the diode 136. In the exemplary embodiment of the present invention illustrated in FIG. 4 the high side FETs 161 and 162 are switched off to prevent current to flow from the buffer capacitor 132 to the motor coil 170.

In embodiments of the present invention, the blocking module may also realize a reverse polarity protection. This blocking module may be integrated into a motordriver IC to reduce costs. The blocking module may be realized as at least one transistor to limit the self-heating during the charging in the PWM ON period. The transistor may be switched OFF during the PWM OFF period, to avoid the current to flow back to the motor decoupling capacitor.

Figure 6:
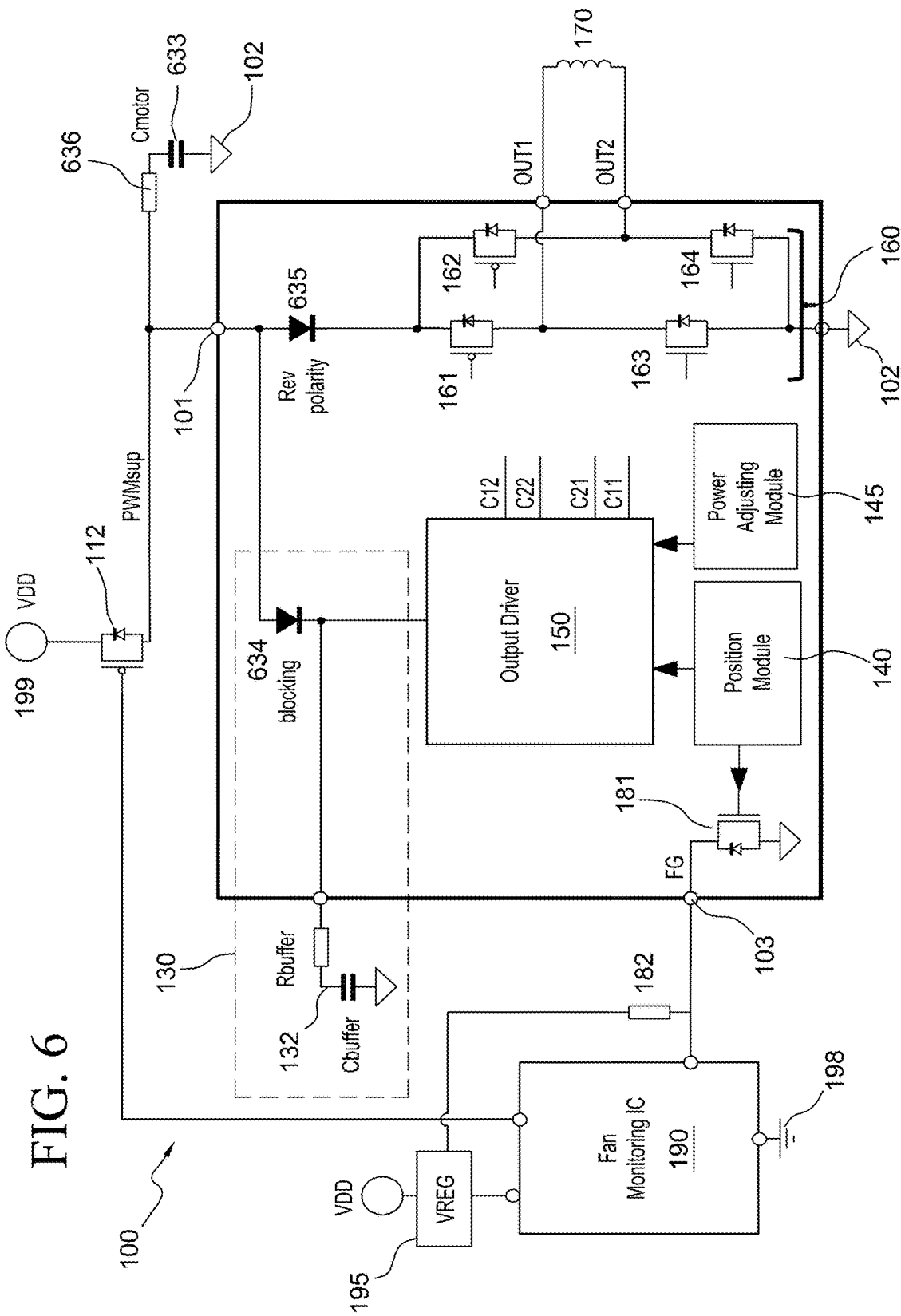
FIG. 6 shows a schematic drawing of a motordriver, driven using high side PWM, comprising an integrated blocking module in accordance with embodiments of the present invention.
Figure 7:
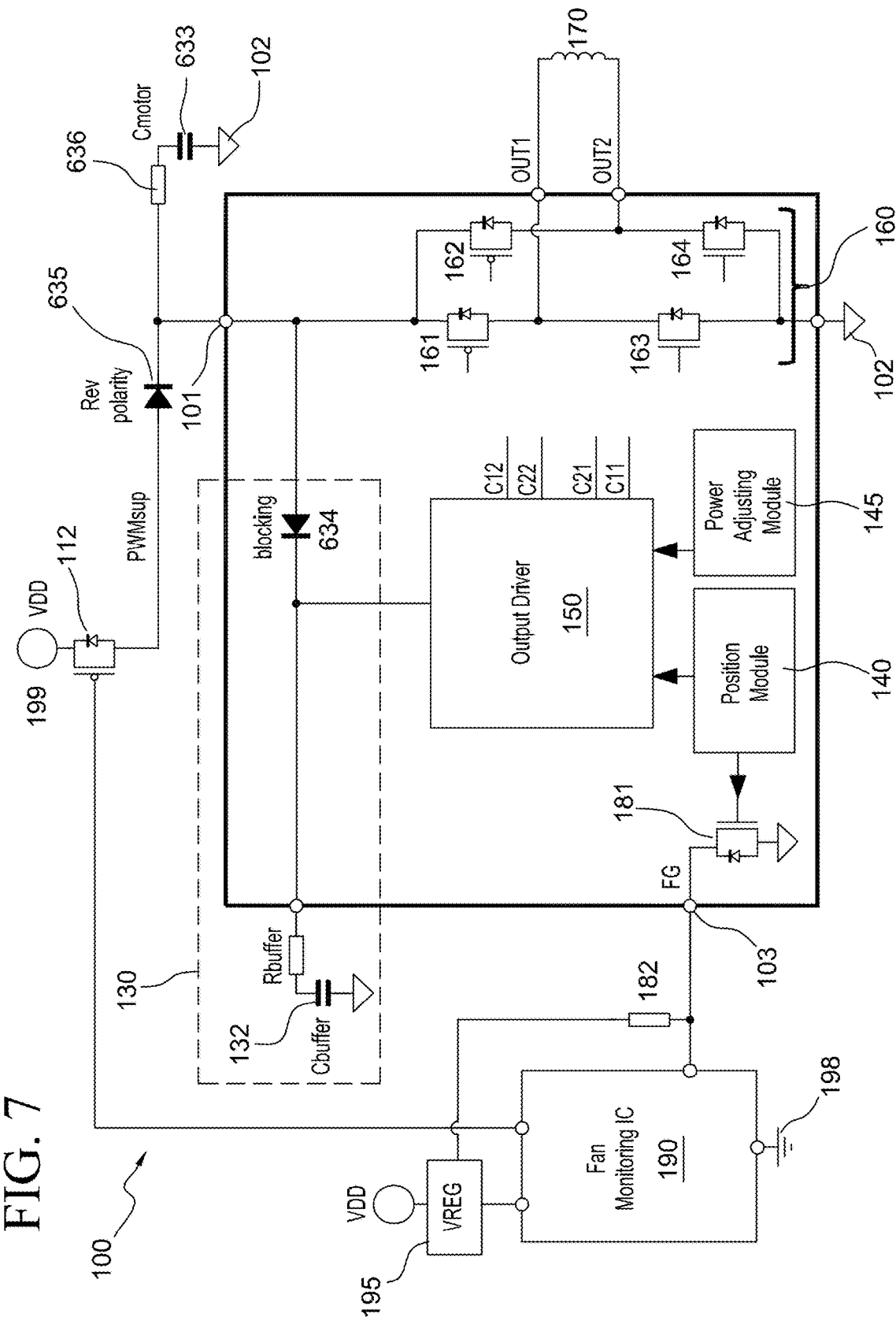
FIG. 7 shows a schematic drawing of a motordriver driven using high side PWM comprising an integrated blocking diode connected after a reverse polarity diode, in accordance with embodiments of the present invention.

In embodiments of the present invention, a dedicated (extra) reverse polarity diode may be implemented to protect the motor for reverse polarity. This extra reverse polarity diode protects the output driver (it avoids current flowing through the body diodes). This is illustrated in FIG. 6 and FIG. 7. In FIG. 6 and FIG. 7 the protection against reverse polarity for the power stage is realized using a dedicated diode 635. In this example, no control module 120 is implemented to switch off the FETs during PWM OFF. Hence, the PWM OFF duty cycle may be unknown. So the bridge driver will keep active. In case of motor PWM, the motor will suffer some braking effect.

Therefore, in the exemplary embodiment illustrated in FIG. 6, current limitation is implemented to control the duty cycle in an automatic way.

In case increased integration is required, the blocking module may be integrated in the motordriver IC. In FIG. 6, a first possible embodiment is shown. In this example, the integration of the blocking module is done using a blocking diode 634. The blocking diode is positioned between the output driver 150 and the power module 130 oriented with its cathode towards the output driver. Optionally also the bridge driver 160 can be protected by a dedicated diode 635 for reverse polarity purposes. The reverse polarity blocking diode 635 is positioned between the bridge driver 160 and the power module 130 oriented with its cathode towards the bridge driver. In this exemplary embodiment of the present invention the buffer capacitor 132 is connected with the cathode of the blocking diode 634 on one side (with possibly in between both a protecting resistor). The capacitor 132 is connected with its other side to the IC ground 102.

In another embodiment, illustrated in FIG. 7, the blocking diode 634 may be connected after the reverse polarity diode 635. Besides that the embodiment, illustrated in FIG. 7, is the same as the embodiment illustrated in FIG. 6. In FIG. 7 the reverse polarity blocking diode 635 is still positioned between the bridge driver 160 and the VDD pin 101 oriented with its cathode towards the bridge driver but the blocking diode is connected between the cathode of the reverse polarity diode 635 and the output driver 150 with its cathode oriented towards the output driver 150. In this way any flyback energy coming from the motor, may be stored onto the buffer cap 132, providing additional energy, and making the module safe from overvoltage damage due to any possible flyback energy.

In yet another exemplary embodiment of the present invention (illustrated in FIG. 8), the blocking module may be implemented as a blocking transistor 834. In that case the motordriver comprises a control module 120. The control module 120 is adapted for switching on the blocking transistor during the PWM ON period and switching off the transistor during the PWM OFF period. This has the benefit of improved efficiency, and also during the charging cycle more energy can be stored onto the buffer capacitor. The reasons therefore being that the voltage drop over the blocking transistor is smaller than the one over the blocking diode in FIG. 7 during the PWM ON period. In this exemplary embodiment of the present invention, the control module 120 is configured to switch off the blocking transistor 834 during the PWM OFF period. Optionally the reverse polarity diode 635 of the bridge driver can also be implemented as a dedicated integrated transistor. In this case the reverse polarity FET has to be switched off during PWM OFF period. In embodiments of the present invention this may be controlled by the control module 120. Optionally the blocking FET 834 can be combined with the reverse polarity protection FET 835.

Figure 8:
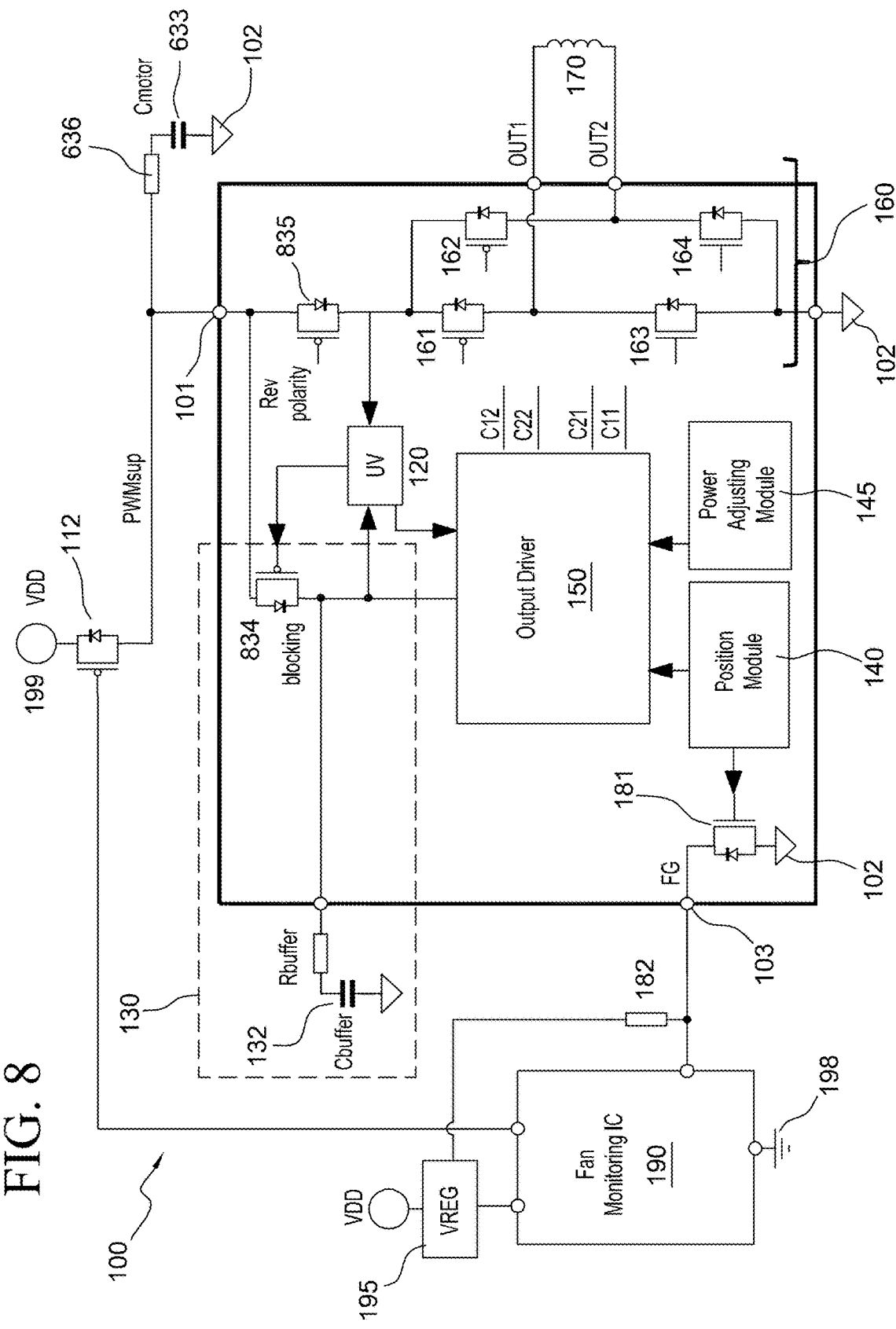
FIG. 8 shows a schematic drawing of a motordriver, driven using high side PWM wherein the blocking module is implemented as an integrated blocking transistor, in accordance with embodiments of the present invention.

In FIGS. 6, 7 and 8 the blocking diode 634 or the blocking FET 834 prevent that current flows from the buffer capacitor 132 to the motor. In these exemplary embodiments of the present invention a decoupling capacitor (the motor capacitor Cmotor 633) may be added that can supply the motor in case of motor PWM control. It is an advantage of embodiments of the present invention that this decoupling capacitor can act as a buffer to supply the motor with energy, and decouple the motor from the inductive effects of the wiring harness connecting the motor to the remote supply VDD 199. In the examples this decoupling capacitor 633 is connected between the VDD pin 101 and the ground pin 102. As illustrated in the figures an additional resistor 636 may be connected in series with the decoupling capacitor 633. Both are then connected between the VDD pin 101 and the ground pin 102.

Figure 17:
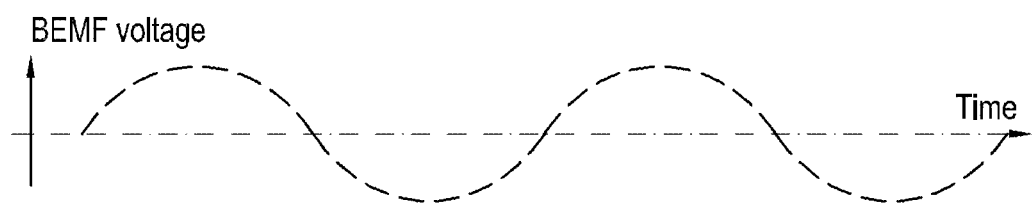
FIG. 17 is a graph a showing a BEMF voltage signal in function of time.

In embodiments of the present invention the motordriver comprises a power adjusting module 145 (illustrated in FIGS. 4, 6, 7, and 8) configured for obtaining a back EMF indicative signal of the motor. As illustrated in the figures this back EMF indicative signal is used as an input for the output driver 150. This signal may be any signal which is representative for the ratio of the actual BEMF voltage amplitude (illustrated in FIG. 17 showing the BEMF voltage in function of time), compared to the maximum BEMF voltage amplitude at maximum rotational speed. It may be the maximum BEMF voltage of the motor, or the actual BEMF voltage. This signal may also be a signal which is derived/reconstructed from the supply PWM duty cycle (e.g. the supply PWM duty cycle, or the PWM ON period, or the PWM OFF period if the supply PWMs frequency is known in advance). In case PWM varies from 10% to 100%, 50% corresponds more or less to half speed and corresponds thus with a ratio of half of the actual BEMF voltage, compared to the maximum BEMF voltage at maximum speed. Such reconstruction can be straightforward, or optimized for specific fans, for instance using look up tables or characterization. Examples will be given below.

Based on this back EMF indicative signal the output driver may adjust the amount of the pulsed power that is driving the motor (e.g. motor PWM).

In embodiments of the present invention, the supply PWM duty cycle may be recovered using for instance an UV detection module.

In other embodiments of the present invention the coil current (Iphase) can be used as BEMF indicative signal, since Iphase=(VDD−BEMF)/Z wherein Z is the motor impedance.

In other embodiments, the amount of power of the pulsed power can also be controlled without control by a BEMF indicative signal. For instance, a current limit can be used to adjust the motor PWM duty cycle, preferably for motors with L/R not more than ten times the motor PWM period. For instance for 20 kHz PWM, L/R can be 4 us, or even up to 400 us. In this case, the lower BEMF voltage at low motor speed, will automatically imply a faster rise of the phase current. Therefore, the current limit threshold will be reached faster at lower speeds, leading to lower duty cycles. Preferably, such current limit level should be chosen such that it does not limit the maximum speed operation. So it should be higher than the maximum nominal operating phase current at maximum fan rotational speed. On the other hand it can be understood that if the current limit is set too high, it will not influence the duty cycle. Therefore, it is a preferred embodiment to have a configurable current limit, to adjust to the needs and/or design of the specific motor.

At low supply PWM duty cycles (duty cycles of the modulated power supply), the motor speed is much lower than its maximum speed. Consequently, the BEMF will be low. If the motordriver is switched on with 100% (supply PWM duty cycle of 100%), a significant peak current may flow, causing stress on the motordriver and on the stator limiting life time and causing audible noise. If the motordriver knows the motor is at a reduced speed (e.g. only at 20% speed), the output driver may reduce the motordriver PWM duty cycle (e.g. it could apply 50% duty cycle or even less) to avoid or limit the peak current. At maximum PWM supply duty cycle, the fandriver should apply 100% motor PWM in order to ensure maximum cooling capability is achieved.

In embodiments of the present invention the motordriver PWM duty cycle is increasing with increasing supply PWM duty cycle. An advantage thereof is that a monotonous increase in speed can be realized.

In embodiments of the present invention adjusting the amount of the pulsed power that is driving the motor may be done through linear control of the driver FETs. In this case the gate voltage of at least one driving transistor in the power stage 160 is reduced, in order to increase the effective resistance of the corresponding driver FET.

In embodiments of the present invention adjusting the amount of the pulsed power that is driving the motor may be done through the application by the output driver 150 of a motordriver PWM duty cycle on the driver FETs in the power stage 160. Applying a PWM current on the motor—in the audible range most sensitive to the human ear—may cause audible disturbance, which is preferably avoided. For this purpose, in prior art motordrivers, PWM frequencies are typically chosen above 15 kHz or even above 20 kHz. While the supply PWM frequencies are typically chosen below 1 kHz, or even below 200 Hz. In this invention, motordriver PWM is combined with supply PWM.

The motordriver PWM Duty cycle, or the linear control of the gatevoltage of the driver FETs, is referred to as the commutation amplitude.

The reduction based on the BEMF indicative signal allows following improvements:
1. reduce the peak currents at low speeds,
2. increase the minimum needed duty cycle.

Moreover such reduction based on the BEMF indicative signal allows to apply these improvements without affecting the maximum speed, and allows to avoid substantial non-linear transition when moving from a supply PWM duty cycle of less than 100% to a supply PWM duty cycle of 100%.
1. A first example of such BEMF indicative signal is the ratio of the phase current compared to a reference current level.
2. A second example is based on sensing the actual BEMF voltage.
3. A third example is based on measuring the ratio of the speed of the motor compared to the maximum speed.
4. A fourth example is based on measuring the supply PWM DC.

In embodiments of the present invention, the BEMF voltage indicative signal may be based on the ratio of the phase current compared to a reference current level. In such case the motor driver is configured to sense the phase current. This sensed value is then compared to a reference current level.

In embodiments of the present invention the at least one reference current level may be preset for instance using an internal memory, or using external configuration components such as resistors or capacitors, or by adjusting the value of a shunt resistor, or it may be hard coded into the motor driver circuit.

The comparison of the reference current level and the actual current level, referred to as current limiting, may be done, for instance using a digital circuitry using a look up table, or using a comparator with an analog value. The result of the comparison defines the resulting motor PWM DC, or the resulting gate voltage of the Linear controlled FETs.

It is an advantage of embodiments of the present invention that peak currents at speeds below the maximum speed can be reduced. When no current limiting function is applied-, the phase current Iphase during the PWM ON period, is proportional to (VDD-BEMF). Since the induced BEMF voltage is proportional to the speed, the skilled person understands that, as the speed reduces below the maximum speed, the phase current will increase.

For instance, in case no current limiting is applied,
for a fan which is able to run at 4000 rpm, and/or draw a peak current of 300 mA at PWM supply DC=100%,
may run at PWM supply DC=50% at 3000 rpm, and/or draw a peak current of 400 mA,
or still, may run at PWM supply DC=20% at 1000 rpm, and/or draw a peak current of 1000 mA.

In embodiments of the present invention, preset current reference level may be slightly higher than the phase current at maximum speed. In the above example, it should be higher than 300 mA in case the fan should be able to reach its maximum speed. For instance, a preset current level of 400 mA will start to be applied for PWM supply DC below 50%.

It is an advantage of embodiments of the present invention that the average phase current is reduced, and therefore the speed of the motor will be further reduced, compared to when no current limiting would be applied. Such reduction of speed at supply PWM duty cycles below 100%, allows to reach lower fan speeds, for a given supply PWM duty cycle. Assume the lowest target speed can only be reached at a supply PWM duty cycle of 10%. Then the application of such current limiting can allow to achieve the lowest target speed with supply PWM DC of for instance 30%. This has several advantages. For instance, each time the supply switches between ON and OFF, the motor changes between acceleration and deceleration. These changes cause vibrations which can lead to fatigue, and contribute to the acoustic noise. Additionally the longer deceleration in case of a small supply PWM DC, and during the small supply PWM ON period the fan has only a short time to compensate for this deceleration, leads to large variations in speed which also contribute to the acoustic noise. Thanks to the increased minimum duty cycle, the acoustic noise can be reduced.

Another advantage of increasing the minimum needed supply PWM DC is that the ON period increases versus the OFF period, therefore the discharging of the buffer capacitor is proportionally less important to the charging time of the buffer capacitor. This may allow to reduce the size of the buffer capacitor in the power module.

An advantage of comparator based current limit is that a self-regulating system is obtained that ensures increased power with increasing PWM supply duty cycle, and smooth transition to 100%. In case a look up table is used, it is an preferred embodiment of the present invention to increase the motor PWM duty cycle as the phase current level approaches the preset current level, and the motor PWM duty cycle is 100% if the motor should be able to achieve its maximum speed.

In embodiments of the present invention, the BEMF voltage indicative signal can be based on the sensing of the actual BEMF voltage, or the ratio of the measured BEMF voltage to the maximum BEMF voltage at maximum speed. Other embodiments of the present invention may be based on the ratio of the speed of the motor compared to the maximum speed of the motor. In these embodiments, the motor PWM DC or the linear control voltage will be defined as a function of the ratio of the BEMF voltage to the maximum BEMF voltage at maximum speed, the ratio of the speed to the maximum speed, or the absolute value of the BEMF voltage, or the value of the speed. The maximum BEMF voltage level, and/or the maximum speed level, used to calculate the ratios can be preset using external components, or through storage in a memory, or can be hard coded in the motor driver circuitry.

In embodiments of the present invention, the BEMF voltage indicative signal can be based on measuring the supply PWM DC. The reduction of the commutation amplitude is defined in function of the measured supply PWM DC In embodiments of the present invention the amount of pulsed power which is driving the motor may be controlled by the output driver by adjusting the phase commutation and/or by adjusting the commutation amplitude.

In embodiments of the present invention, control of the amount of the pulsed power may be done depending on the rotor position and/or speed monitored by the position module.

In embodiments of the present invention, the control module 120 comprises an UV protection module which is configured to detect that the voltage supplied with the PWM supply, is lower than the voltage stored on the buffer capacitor 132. A basic implementation can be done by a simple comparator that compares both voltage levels. In an alternative implementation, the UV protection module compares the external supply voltage to an absolute reference voltage. This UV voltage level should then preferably be as high as possible, in order to minimize the size of the buffer capacitor to ensure the needed energy can be stored to overcome the maximum PWM off duration.

For instance for an application with supply voltage 12v+/−0.5V, and a UV level that is +/−1V guaranteed, the UV level can be set to 12−1.5=10.5V.

In embodiments of the present invention, the motor speed may be controlled using an open loop system. In that case, the motor speed itself is not measured but for a given thermal condition, the motor may be provided with a corresponding supply PWM duty cycle. The actual motor speed may vary from the nominal value due to motor-to-motor variations, power supply tolerance, wear, and other uncertainties.

In other cases, especially when predictable acoustic noise levels, or constant speed are important, it is advantageous to have control over the motor's actual RPM. Therefore, in embodiments of the present invention, the motordriver may comprise a tachometer, or Frequency generator output (FG), and provide feedback to the motor monitoring IC, which can adjust the supply PWM duty cycle, until target speed is detected on the FG output.

In other embodiments, the motordriver itself can have a closed loop speed control implemented. In that case the applied supply PWM duty cycle is used as indication of the requested target speed, for instance using a look up table.

In prior art motor driving systems the motor speed is monitored by counting the number of tachometer pulses occurring during a fixed period of time. This works well if it is possible to count a suitably large number of pulses during a sufficiently short period of time. As an example, a 3000 RPM motor that produces two pulses per revolution will generate a 100 Hz tachometer signal when operating at full speed. If it is required to measure and update the motor speed once per second, only 50 pulses can be counted when the motor is spinning at half speed. This may give enough resolution to determine that the motor is operating, but not enough for precision motor speed control.

Figure 9:
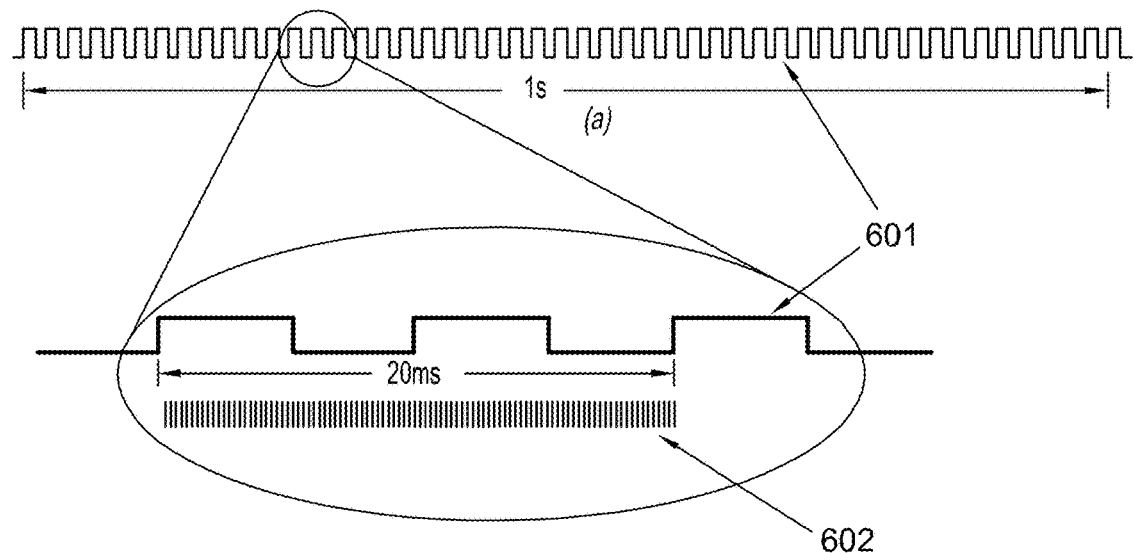
FIG. 9 shows a graph illustrating tachometer periods and a reference clock with a higher frequency.

In prior art systems this may be solved by providing a motor controller which can generate a reference clock 602, generally in the range of a few kHz, and count the number of clock cycles that occur during a fixed number of tachometer periods 601 (usually 1, 2, or 4), as shown in FIG. 9. This allows a tachometer count to be completed in a few milliseconds, so the approach is compatible with closed-loop motor speed control. Moreover, if the motordriver FG (frequency generator) is already averaged over 1 mechanical turn, it is only required to capture 1 tachometer period.

The motor speed may be monitored by monitoring the supply current to the motor. This may be done using a sensor resistor. The approach is appropriate for linear drive and high side PWM power supply drive.

However, a complication arises when a motor is driven by a low side pulse-width modulated power supply. During the portion of the PWM waveform when the motor's power supply is off, the motor driver cannot produce tachometer pulses.

State of the art Motor controller ICs have an option that allows monitoring of the motor's tachometer signal only during the "on" portion of the PWM waveform, but there are cases in which the "on" period is too short to allow proper tachometer measurement.

As an example, consider a 2400 RPM motor with two tachometer pulses per revolution. If this motor is driven by a 50% duty cycle, 30 Hz-modulated power supply, it will be spinning at about half speed (1200 RPM). This will result in a tachometer frequency of 40 Hz (electrical rotations per second as emitted by FG output of the motordriver for a 2coil motor), or a tachometer period of 25 ms (25 ms high, 25 ms low). With a 30 Hz PWM signal at 50% duty cycle, the power supply will be applied to the motor for 16.7 ms during each PWM cycle. The motor's internal circuitry will, therefore, have only 16.7 ms available to generate a 25 ms tachometer signal, so the tachometer signal will not be usable. Note that a much faster motor would work better. For example, a 9600 RPM motor would generate a tachometer signal with a period of 6.25 ms, which would be compatible with the 30 Hz PWM signal at 50% duty cycle.

In embodiments of the present invention the motordriver comprises a feedback unit. Such a feedback unit comprises an input and an output 103, wherein the feedback unit and the position module 140 are configured such that when the input of the feedback unit is controlled by the position module 140 the output is indicative for the status of the motor. The status of the motor may be indicated in several ways. It may for example be indicated by industry standards like FG (frequency generator output) and/or RD (rotation detection signal). The invention is, however, not limited thereto.

In embodiments of the present invention the feedback unit comprises an open drain transistor 181 wherein the position module 140 is configured to control the gate of the open drain transistor 181. An example of such a configuration is shown in FIG. 6, FIG. 7, and FIG. 8.

FIGS. 6, 7 and 8 show a configuration wherein the motordriver is powered by PWM on the high side (HS switched PWM). In this example, the drain of the open drain transistor is connected with a pull up resistor 182 to a remote reference supply voltage used by the fan monitoring IC 190. The fan monitoring IC is connected to a ground 198. In the examples of FIGS. 6, 7 and 8 this voltage is generated by the voltage generating module 195. The source of the open drain transistor 181 is, in this example, connected with the ground pin 102. In this example the feedback pin 103, from which the output signal can be obtained, is connected to the interconnection between the drain of the open drain transistor 181 and the pull up resistor 182.

In case the motordriver is powered by PWM on the low side (LS switched PWM), the drain is connected to a pull down resistor which is connected to the fan monitoring IC 190 ground 198 and the source is connected to a supply node on the motordriver, for instance VDD pin.

In both cases, during operation, the open drain transistor is powered during the PWM ON period and during the PWM OFF period.

In embodiments of the present invention, the feedback unit comprises a high side current source 181 and a pull down resistor 183. An example thereof is illustrated in FIG. 4. The high side current source 181 is connected to the pull down resistor 183, the feedback pin 103 is connected to the interconnection between the high side current source and the pull down resistor and the high side current source is connected with the power module of the motordriver (such that it is also powered during the PWM OFF period). A remote controller (e.g. fan monitoring IC 190) may be connected to the feedback pin 103. The ground 198 of the remote controller 190 should be the same as the ground to which the pull down resistor 183 is connected. The current source may be controlled by a signal from the position module which keeps track of the position and/or speed of the rotor such that in operation the current source generates a current which is indicative for the frequency of the motor. For instance, a 100 uA current source with a 47 k Ohm resistor will yield a 4.7V signal. An example of such a configuration is shown in FIG. 4. In this exemplary embodiment of the present invention, the fan monitoring IC 190 also comprises the PWM supply module 114. Thereby the FG feedback can be used to control the PWM supply module.

The current through the current source will result in a voltage on the feedback pin. The voltage may be a frequency generator or tachometer signal (an F.G. signal) or it may be a rotation detection or lock alarm signal (an R.D. signal). A rotation detect signal is high if the motor is OK and is low (pull-down) in case of a motor failure or in case of no rotation.

The signal on the feedback pin may be received and inverted by a monitoring IC. The current (for instance 0.1 mA or 1 mA) will now be taken from VDD.

Figure 10:
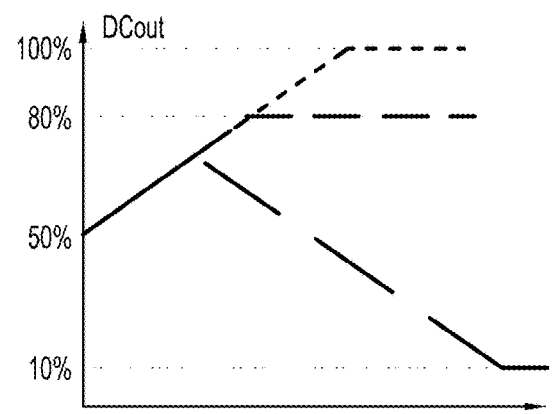
FIG. 10 shows a graph wherein a soft start of a BLDC motor is illustrated.
Figure 10:
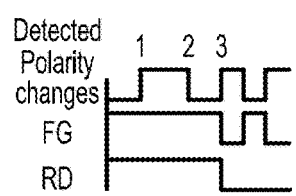

FIG. 10 shows a graph wherein a soft start is illustrated. The x-axis is the time axis, the y-axis is the applied power (DCout) as a percentage of the full power. In order to limit the inrush current when the motor is started a soft start function is implemented. Such inrush current would be the consequence of excessive high DCout, while BEMF is still low. A possible implementation of a soft start, is shown in FIG. 10. In this example, DCout is increased from 50% to 100% at a fixed rate, for instance 100%/s. As soon as the position module has detected three electrical half periods, the DCout can adjust to a target DCout. The target DCout may for example be configurable. FIG. 10 shows the FG signal and the RD signal in function of time as well the detected polarity changes. As can be seen from the figure, in this example the FG signal starts toggling from the third edge of the curve representing the polarity changes and also the RD signal goes low from this third edge.

Figure 11:
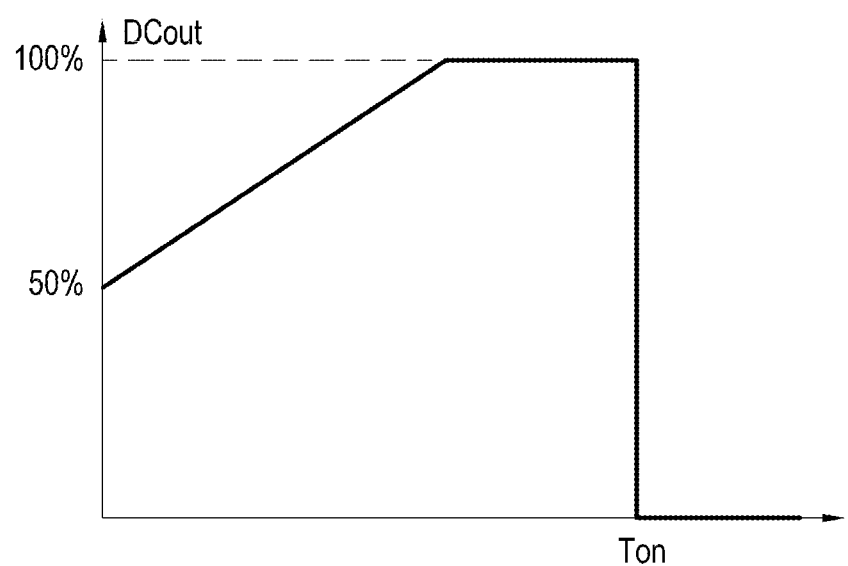
FIG. 11 shows a graph illustrating the FG signal and the RD signal with locked rotor detection.

FIG. 11 shows a graph illustrating the FG signal and the RD signal with Locked Rotor Detection. In that case RD and FG remain high. Note that in case of a locked rotor detection during operation, RD and FG will go high during operation. As can be seen from the graph the applied power is gradually increased to a DCout of 100%. Eventually it is switched to 0% because of the locked rotor detection.

Figure 12:
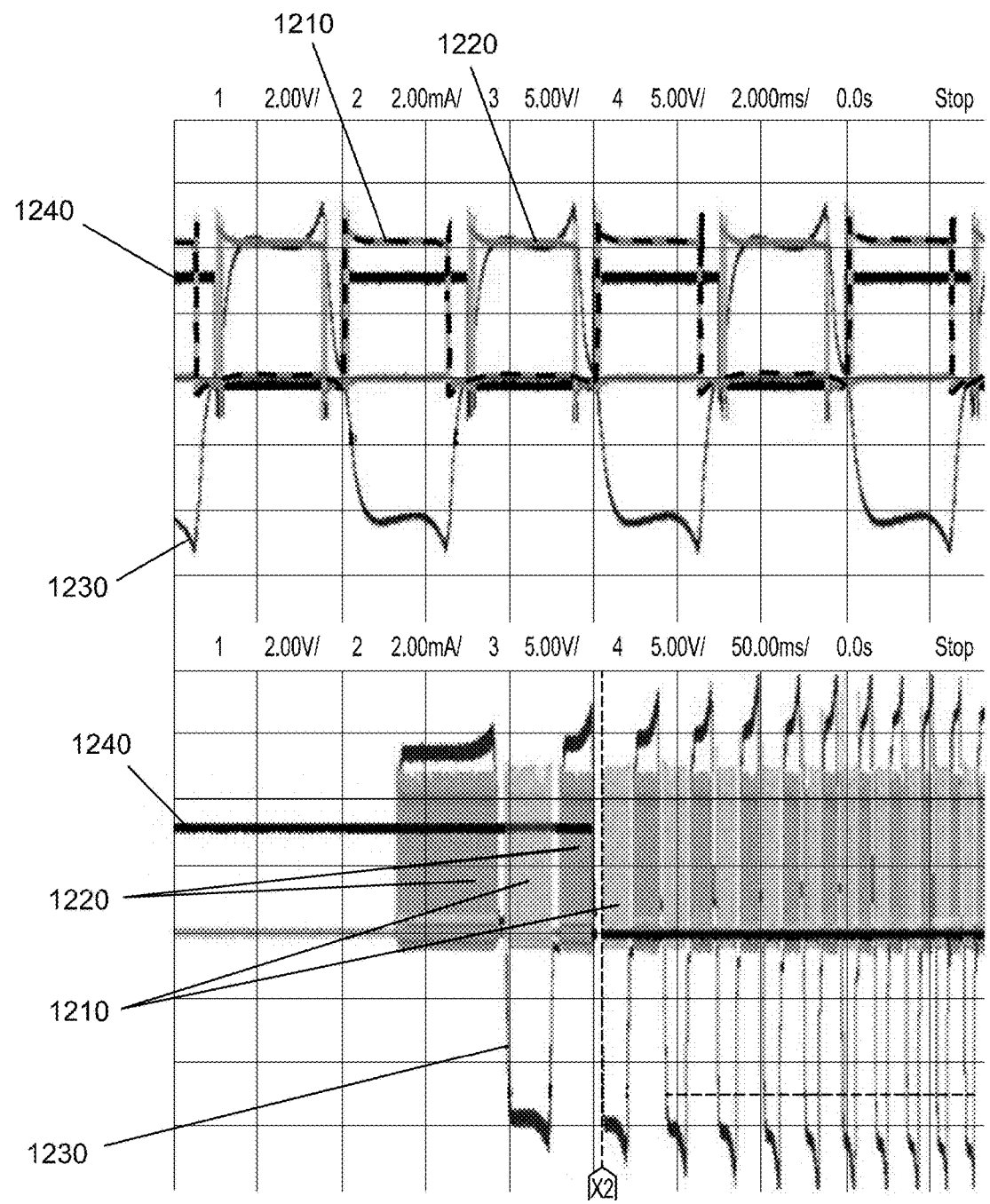
FIG. 12 shows the traces of motor signals during operation of the motor.

FIG. 12 shows the traces of motor signals during operation of the motor. In the top graph the FG signal 1240 is shown during operation and in the bottom graph the RD signal 1240 is shown at start up. Both graphs show the driving signals 1210 and 1220 on the coil terminals in function of time as well the phase current 1230. As can be seen on the top graph, the FG signal is toggling synchronous with the driving signals.

As can be seen from the bottom graph the RD signal resets to the unlocked state after the third magnetic transition.

In a second aspect embodiments of the present invention relate to method for driving a brushless DC motor which is powered with a pulse width modulated (PWM) power supply and controlled by a motordriver. The method comprises a step wherein an energy storage medium of a power module is charged during a PWM ON period. The method moreover comprises a step wherein at least part of the motordriver is powered using the energy storage medium during a PWM OFF period such that a position of a rotor in the motor is monitored during the PWM ON period and during the PWM OFF period.

It is advantageous that the position and/or speed of the rotor is also monitored during the PWM OFF period because this allows a smooth restart of the motor during the PWM ON period. As the position is known during and also directly after the PWM OFF period this information can be used for driving the power stage to obtain a more continuous rotation of the motor.

The invention claimed is:

1. A motordriver for controlling a brushless DC motor having a stator with at least one winding, and a rotor with permanent magnets, the motordriver comprising:
   an output driver electrically connected to a power stage, which is configured to be electrically connected to the motor, wherein the output driver is adapted for controlling phase commutation of the power stage, a VDD pin for connecting a power supply and a ground pin for connecting a ground wherein a PWM pin is either the VDD pin or the ground pin and wherein the PWM pin can be used for connecting a pulse width modulation module such that the motordriver can be powered in a pulsed way by modulating the power from the power supply such that during a PWM ON period the motordriver and the motor are powered by the power supply and such that during a PWM OFF period the motordriver and the motor are not powered by the power supply, a position module configured for monitoring a position of a rotor in the motor and/or for monitoring a speed of the rotor, wherein the motordriver is configured such that at least a part of it remains active during the PWM OFF period, wherein this active part comprises at least part of the position module, a power module configured for powering the active part of the motordriver during the PWM OFF period, the power module comprising an energy storage medium and a blocking module which are configured such that during the PWM ON period the energy storage medium can be charged by the power supply, and such that the blocking module can block current flowing from the energy storage medium back to the power supply, and block current flowing from the energy storage medium to the motor during the PWM OFF period.

2. A motordriver according to claim 1 wherein the motordriver comprises a plurality of components implementing a specific functionality of the motordriver and a control module configured for activating and/or deactivating at least some of the components, and/or changing the functionality of at least some of the components when the powering of the motor changes between the PWM ON period and the PWM OFF period.

3. A motordriver according to claim 1, the motordriver comprising a power adjusting module configured for obtaining a back EMF indicative signal of the motor and wherein the output driver is adapted for reducing the amount of the pulsed power that is driving the motor and /or for reducing peak currents in the motor, by reducing a PWM duty cycle of the motordriver and/or by reducing a gate voltage of at least one driving transistor in the power stage, based on the back EMF indicative signal.

4. A motordriver according to claim 1, wherein the output driver is adapted for applying soft switching based on the rotor position and/or speed monitored by the position module.

5. A motordriver according to claim 1, wherein the energy storage medium is a buffer capacitor.

6. A motordriver according to claim 1, wherein the control module comprises a detection circuit configured for detecting the PWM OFF period by comparing a signal on the PWM pin with a threshold level.

7. A motordriver according to claim 1, the motordriver comprising a feedback unit, the feedback unit comprising an input and an output, wherein the feedback unit and the position module are configured such that when the input of the feedback unit is controlled by the position module the output is indicative for the status of the motor.

8. A motordriver according to claim 7, wherein the feedback unit comprises an open drain transistor wherein the position module is configured to control the gate of the open drain transistor to generate an output, which is indicative for the status of the motor.

9. A motordriver according to claim 7, wherein the feedback unit comprises a pull down resistor wherein one terminal of the pull down resistor is connected to the output and wherein an opposite terminal of the pull down resistor is adapted to be connected to a ground, and wherein the feedback unit comprises a current source connected between the output and the power module, or a dedicated supply that takes its energy from the power module, wherein the current source is controlled by the position module such that in operation the output is indicative for the status of the motor.

10. A method for driving a brushless DC motor, which is powered with a pulse width modulated power supply and controlled by a motordriver, the method comprising:

charging an energy storage medium of a power module during a PWM ON period, and blocking current flowing from the energy storage medium back to the power supply, and blocking current flowing from the energy storage medium to the motor during a PWM OFF period, powering at least part of the motordriver using the energy storage medium during the PWM OFF period such that a position of a rotor in the motor is monitored during the PWM ON period and during the PWM OFF period.

11. A method according to claim 10, the method comprising:

activating and/or deactivating of components which are implementing a specific functionality of the motordriver, and/or changing the functionality of the components of the motordriver when the powering of the motor changes between the PWM ON period and the PWM OFF period.

12. A method according to claim 10, the method comprising:

obtaining a BEMF indicative signal of the motor, controlling how much of the power from the power supply is driving the motor based on the BEMF indicative signal, by reducing a PWM duty cycle of the motordriver and/or by reducing a gate voltage of at least one driving transistor in the power stage.

13. A method according to claim 10, the method comprising:

generating an output signal which is indicative for the status of the motor using a feedback unit, wherein the feedback unit comprises an input and an output, wherein the feedback unit and the position module are configured such that when the input of the feedback unit is controlled by the position module the output is indicative for the status of the motor, powering the feedback unit during the PWM OFF period.

* * * * *